United States Patent [19]

Beele

[11] Patent Number: 5,108,060
[45] Date of Patent: Apr. 28, 1992

[54] SEALING BUSHING

[75] Inventor: Johannes A. Beele, KE Opmeer, Netherlands

[73] Assignee: CSD International B. V., KE Opmeer, Netherlands

[21] Appl. No.: 542,381

[22] Filed: Jun. 22, 1990

[30] Foreign Application Priority Data

Jun. 23, 1989 [NL] Netherlands ............... 8901597

[51] Int. Cl.$^5$ .................................. F16L 5/00
[52] U.S. Cl. ............................. 248/56; 52/221
[58] Field of Search .............. 248/56, 57; 52/220, 52/221, 232

[56] References Cited

U.S. PATENT DOCUMENTS

| | | | |
|---|---|---|---|
| 2,732,226 | 1/1956 | Brattberg | 248/56 X |
| 3,282,544 | 11/1966 | Brattberg | 248/56 |
| 3,489,440 | 1/1970 | Brattberg | 248/56 |
| 4,086,736 | 5/1978 | Landrigen | 248/56 X |
| 4,093,818 | 6/1978 | Thuaites | 248/56 X |
| 4,702,444 | 10/1987 | Beele | 248/56 |
| 4,840,408 | 6/1989 | Nishiki et al. | 248/56 X |
| 4,889,298 | 12/1989 | Hauff | 248/56 |
| 4,901,956 | 2/1990 | Jacobsen | 248/56 |
| 4,919,372 | 4/1990 | Twist et al. | 248/56 |

FOREIGN PATENT DOCUMENTS

| | | | |
|---|---|---|---|
| 2429049 | 1/1976 | Fed. Rep. of Germany | 248/56 |
| 2632325 | 1/1978 | Fed. Rep. of Germany | 248/56 |
| 3809885 | 5/1989 | Fed. Rep. of Germany | 248/56 |
| 2186442 | 8/1987 | United Kingdom | 248/56 |
| 2204922 | 11/1988 | United Kingdom | 248/56 |

*Primary Examiner*—Ramon O. Ramirez
*Attorney, Agent, or Firm*—Pennie & Edmonds

[57] ABSTRACT

A bushing for the sealing passage of a cable, pipe and the like through a wall, comprising a frame made of a rigid material which may be sealingly inserted in an aperture provided in the wall, as well as one or more parallelepipedal blocks of a resilient material which may be composed from two identical halves, which blocks in their composite state exhibit a bore adapted to the shape and dimensions of a cable to be passed through, which blocks can be inserted in the frame aperture so as to be a fine fit, with the two halves of every block encasing a cable, whereby the blocks are dimensioned such that, under operating conditions of the bushing, the extend outwards on at least one side of the frame in a direction transverse to the plane of the frame, which blocks are provided with circumferential internal ribs over at least a part of their length, and whereby blocks whose outer faces rest against an inner wall of the frame under operating conditions of the bushing are provided with external ribs over at least a part of the said outer faces.

17 Claims, 4 Drawing Sheets

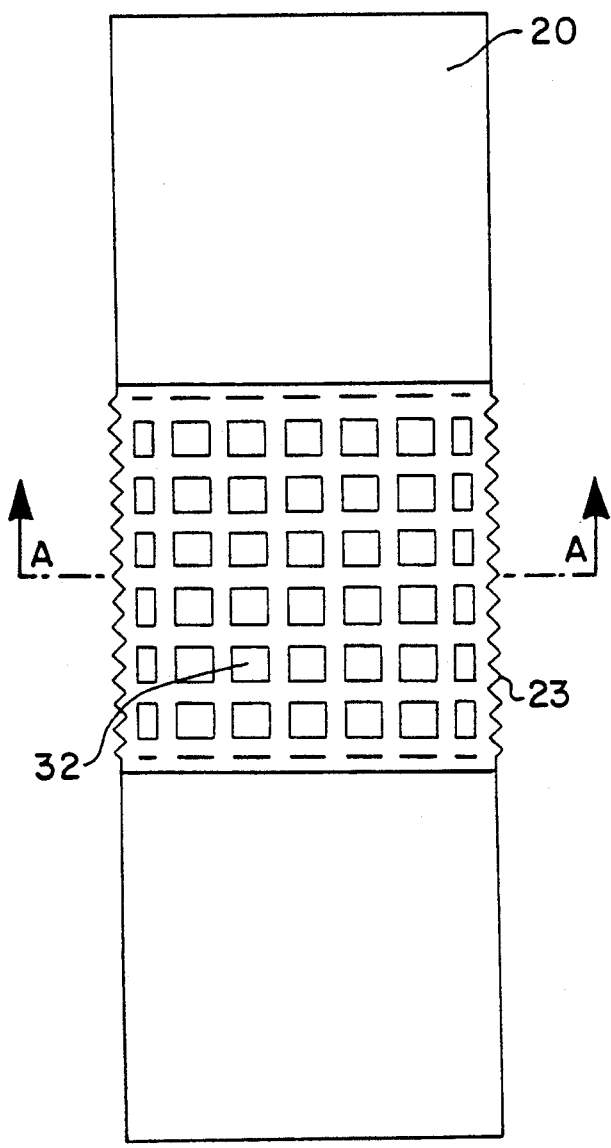
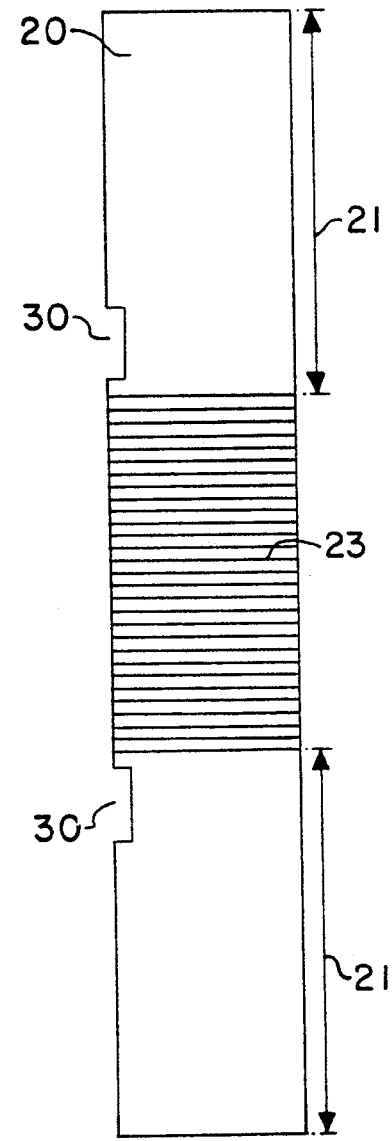
FIG. 15b  FIG. 15a
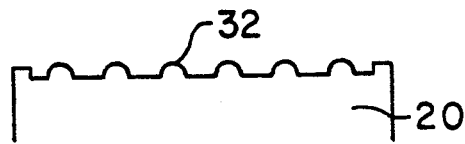
FIG. 15c

SEALING BUSHING

BACKGROUND OF THE INVENTION

The invention relates to a bushing for the sealing passage of a cable, pipe and the like through a wall, comprising a frame made of rigid material which may be sealingly inserted in an aperture provided in the wall, as well as one of more parallelepipedal blocks of a resilient material such as rubber which may be composed from two identical halves, which blocks in their composite state exhibit a bore adapted with narrow tolerances to the shape and dimensions of a cable to be passed through, which blocks can be inserted in the frame aperture so as to be a fine fit, with the two halves of every block encasing a cable, whilst in additioning tightening means with a pressure plate are present which can compress the blocks inserted in the frame aperture in the plane of this aperture such that a sealing compression is effected between the two halves of any one block, between the outer faces of mutually adjacent blocks, between the wall of the bores and the outer surface of the cables contained therein, as well as between the outer faces of the blocks and the inner walls of the frame.

Such bushing is known from the European patent specification bearing the publication number 0 183 300.

Several drawbacks attach to such a known bushing, especially the following ones:

1. The blocks used in this known bushing are made of incompressible rubber, so that when tolerances of, say, more than 1 mm have occurred in the manufacture of the frame or the blocks, these blocks can hardly if at all be thrust into the frame, or they lie loose in the frame.
2. The known bushing contains a rigid pressure plate with a thrust bolt as the principal tightening means. Threading the pressure bolt down causes a concentrated load—which in actual practice may amount to a few tons!—to be exerted upon the rigid pressure plate in order to achieve as uniform a distribution as practicable of downward directed forces acting upon the blocks inserted in the frame. By these forces all blocks in the frame should be deformed in such a way that a proper sealing of, for instance, cables passed through is ensured.

In actual practice, however, the distribution of forces proves to be nowhere near uniform, because a counter-reaction of the non-compressible rubber mass of the blocks incited by the aforesaid enormous forces reduces the downward directed pressure especially near the sides of the frame. Also, in actual practice it is only the blocks disposed in the uppermost zone inside the frame which undergo the aforesaid requisite deformation and, in addition, these blocks absorb virtually the entire downward directed pressure. The said deformation develops outwards of the frame, which is obviously highly undesirable.

The outcome of the drawbacks so far mentioned in item 2 proves to be in practice not only that the blocks with the cables passed through them in the uppermost zone of the frame are subject to severe deformation, which is generally found to be permanent, so that proper sealing has become impossible, but also that the blocks disposed in the bottom zone of the frame do not undergo the aforesaid requisite deformation, which again results in an inadequate sealing of, for instance, cables passed through; partly on account of the localized appearance of fissures between adjacent blocks.
3. The pressure plate used in the known bushing is provided with a recess on its edges in order that this pressure plate may invariably be a true fit inside the frame even in the event of tolerances in the frame's dimensions. The said recess, however, causes an upward displacement of the rubber of the blocks which is undergoing deformation during compression. Under operating conditions of the bushing, an irregular edge of protruding rubber may appear on both edges of the pressure plate as a result.
4. The known bushing is provided with rod-shaped elements which may be supported with their ends in two oppositely disposed grooves in flanges of the frame, whilst the central part of a rod-shaped element may be located in a groove of a half block such that it prevents any displacement in a transverse direction relative to the plane of the frame.

As the rod-shaped elements are frequently of especially sturdy design in order to afford extra protection against displacement and the grooves are not generally given corresponding extra depth, it turns out in actual practice for reasons mentioned hereinbefore under item 2 that inadequate sealing is attained between rows of blocks which a rod-shaped element is confined.
5. The frame used in the known bushing is composed by, for instance, welding angle irons or metal strips together. This construction gives rise to small continuous weld fissures or beads in the angles of the frame all its adverse consequences on the sealing.

Owing to the non-compressibility of the rubber, the blocks cannot fill up these weld fissures in particular.
6. In the known bushing, the downward directed forces produced by the tightening means should deform all blocks contained within the frame as well as, for instance, the resilient cables passed through in such a way that an effective sealing is obtained. This deformation frequently tends to lead to unacceptable damage to the cables, especially to cables passed through the uppermost zone of the frame. In addition, when armoured and/or non-compressible cables are passed through, only deformation of the blocks disposed within the frame takes place, leading to inadequate sealing.
7. In actual practice the known bushing proves insufficiently fire-resistance, as will be elucidated hereinafter.

A conflagration present on, for instance, one side of the known bushing under operating conditions reaches a temperature of about 900° C. Heat from the conflagration is transmitted by
   the frame
   through bolts
   the steel pressure plate
   conductors of cables passed through
   rod-shaped elements
   rubber lead-through blocks.

From the heat-transfer coefficient of steel it becomes instantly clear that at the aforesaid conflagration temperature the side facing away from the conflagration will undergo a considerable rise in temperature (180° C. is generally considered the maximum admissible). In consequence, the three first-named component parts will very soon show the admissible rise in temperature, if not protected by extra insulation. Depending upon the mass of the (copper) conductors, which in fact have an even higher coefficient of heat transfer than steel, a very rapid transmission of heat from the conflagration takes place. Adequate insulation of cables passed through is one mean of restricting a measurable rise in temperature on the side facing away from the fire. With the known bushing this is impossible, because there is no direct contact between the conductors and any heat-absorbing rubber. The rod-shaped elements and the rubber lead-through blocks will exhibit a very slight heat transfer (the K-value of heat-resistant rubber is about 0.18 W/mK). With aforesaid conflagration temperature, the inadequate fire resistance of the known bushing will cause cable sheathing to soften, to emit a good deal of smoke and even to ignite in an unfavourable situation. These effects are strengthened by the inadequate sealing provided by the known bushing, as has been expounded in the foregoing items 1 to 6 inclusive. Hot flue gases will be forced through all apertures by positive pressure in a burning space and ultimately ignite the flue gases emitted by insulating materials.

SUMMARY OF THE INVENTION

The object of the present invention is to provide a bushing for the optimum sealing passage of a cable, pipe and like through a wall, which bushing possesses an excellent fire resistance.

To achieve this object, a bushing of the type mentioned hereinbefore is characterized according to the invention in that the blocks are dimensioned such that under operating conditions of the bushing, they extend outwards on at least one side of the frame in a direction transverse to the plane of the frame, which blocks are provided with circumferential internal ribs along at least a part of their length, whilst blocks whose outer faces rest against an inner wall of the frame under operating conditions of the bushing are provided with external ribs along at least a part of the said outer faces. The presence of an inner and an outer profile in the form of flexible internal and external ribs ensures an optimum sealing at all times, since any tolerances in the dimensions of blocks, frame and cables to be passed through can easily be taken up by compression of these flexible rubber ribs without entailing compression or deformation of the blocks or the individual cables passed through the frame, even when the necessary compressive forces are applied. The outward extension present on at least one side of the frame transverse to the plane of the frame under operating conditions of the bushing has the advantage that the bushing possesses excellent fire resistance in that directions because of the increased quantity of, for instance, fire-resistant rubber.

One embodiment of a bushing according to the invention is characterized in that blocks which are placed on top of each other under operating conditions of the bushing, are provided with a profile on their adjacent outer faces. Less sealing compression is thereby needed so as to ensure a tight sealing between adjacent blocks lying above each other during these conditions.

A further embodiment of a bushing according to the invention is characterized in that the blocks are dimensioned such that under operating conditions of the bushing, they extend outwards on both sides of the frame in a direction transverse to the frame. The fire resistance of the bushing according to the invention is thereby optimized because of the symmetry between rubber masses of, say, 60 mm disposed on both sides of the frame.

A further embodiment of a bushing according to the invention in which the tighening means comprise a rigid pressure plate with a thrust bolt is characterized in that the rigid plate is a steel plate whose edges which rest against an inner wall of the frame under operating conditions of the bushing, have been encased in a whether or not fire-resistant plastic. This encasement in whether or not fire-resistant plastic material preferably consists in sheathing with a whether or not fire-resisting rubber so as to prevent heat transmission through mechanical contact with the inner walls of the frame. The other edges of the steel pressure plate have not been sheathed in that way in order to avoid deformation of the pressure plate during compression.

A further embodiment of a bushing according to the invention which comprises a sealing piece which may be fitted on top of the pressure plate inside the frame is characterized in that the sealing piece is dimensioned such that under operating conditions of the bushing it extends outwards on at least one side of the frame in a direction transverse to the plane of the frame and that those outer faces of the sealing plate which rest against the inner wall of the frame under operating conditions of the bushing are provided at least partly with external ribs.

A further embodiment of a bushing according to the invention is characterized in that the sealing piece consists of at least two interconnecting parts and that its bottom face has a recess into which the steel plate can be received. As the steel plate is at it were embedded in the recess under operating conditions, no heat transmission takes place through this steel plate. The interconnection of the parts of the sealing piece is preferably effected by so-called dowelling, enabling the parts to be readily introduced into the uppermost zone of the frame from the outside and connected together. Dowelling has the advantage that the parts of the sealing plate remain interconnected under compressive loads during operation and therefore cannot be thrust out of the frame.

A further embodiment of a bushing according to the invention is characterized in that the external and/or internal ribs have a substantially saw-tooth or triangular crosssection. In practice, internal and/or external ribs so shaped prove to afford optimum sealing.

A further embodiment of a bushing according to the invention is characterized in that provision is made for at least one protecting plate, whether or not made of a fire-resistant plastic, which may be fitted substantially over that part of an assembly of blocks and possibly the sealing piece which projects outside on at least one side of the frame in a direction transverse to the plane of the frame. The said protecting plate, which is preferably made of a fire-resistant rubber, serves to shield the walls of the frame from the heat of a conflagration.

A further embodiment of a bushing according to the invention is characterized in that provision is made for at least one hood, moulded from whether or not perforated steel plate, which may be mounted on top of the protecting plate(s) to be fitted earlier. This hood serves to retain a protective carbon deposit formed by, for instance, rubber upon exposure to fire. The said perforations have, if required, been made in the hood to save weight.

A further embodiment of a bushing according to the invention is characterized in that the design of the protective hood(s) includes a frame composed of at least two sections with upright flanges.

A further embodiment of a bushing according to the invention is characterized in that provision is made for anchoring strips which may be inserted on at least one side of the frame in a direction parallel to the plane of the frame. Unlike the rod-shaped elements of the known bushing, these anchoring strips have the advantage that they need not be laboriously inserted into the frame at an oblique angle (from above). Oblique introduction of the rod-shaped elements into the frame is imperative, since these elements rest under operating conditions in grooves provided in flanges on the frame.

A further embodiment of a bushing according to the invention is characterized in that the blocks have outer faces provided with grooves and that recesses are present in the protecting plate(s), if included, so that the anchoring strips can be pushed from the outside into the grooves of the blocks, whereupon the protecting plates can be fitted, allowing the anchoring strips to pass through the recesses.

BRIEF DESCRIPTION OF THE DRAWINGS

The invention will now be elucidated with reference to the accompanying figures, in which:

FIG. 13 represents a sealing piece according to the invention, which sealing piece consists of two interconnecting halves provided with external ribs having a saw-tooth cross-section;

FIGS. 15a-15c show another embodiment of one half of a parallelepipedal block of a bushing according to the invention in side view, in plan view and in cross section, respectively.

DETAILED DESCRIPTION OF THE PREFERRED EMBODIMENTS

Figure 1:
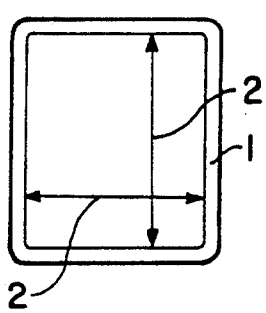
FIGS. 1-9 show the known bushing or parts thereof according to the state of the art.

FIG. 1 is a schematic view of the known bushing according to the state of the art with a frame 1 which may exhibit tolerances in dimensions in the directions indicated by arrows 2, so that the known blocks can either hardly, if at all, be pushed into the frame 1 or lie loose in frame 1.

Figure 2:
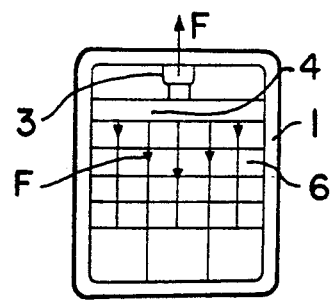

FIG. 2 depicts the known bushing with the frame 1 of FIG. 1, showing how the forces designated F are distributed when threating down a thrust bolt 3 causes a concentrated load to be exerted upon a rigid pressure plate 4.

Figure 3:
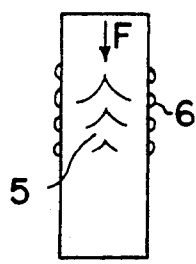

FIG. 3 is a side view of the known bushing according to FIG. 2. Forces F acting in the directions 5 cause blocks 6 disposed in the uppermost zone of frame 1 in particular to be deformed towards the outer sides of frame 1.

Figure 4:
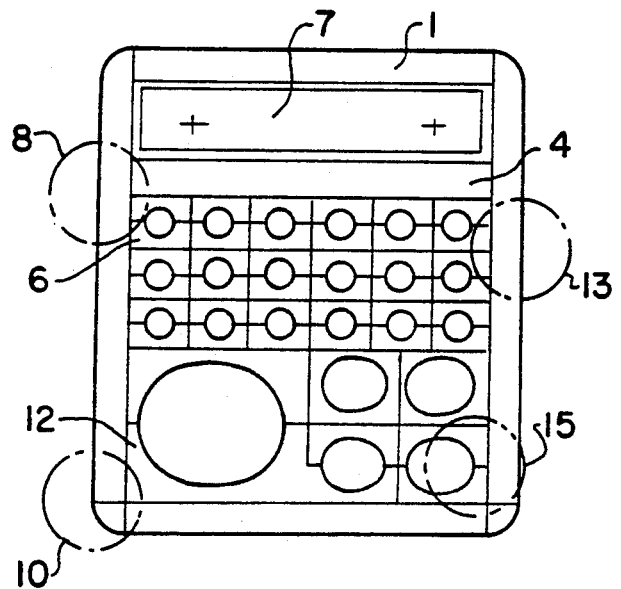

FIG. 4 represents the known bushing with a sealing plate 7 according to the state of the art.

Figure 5:
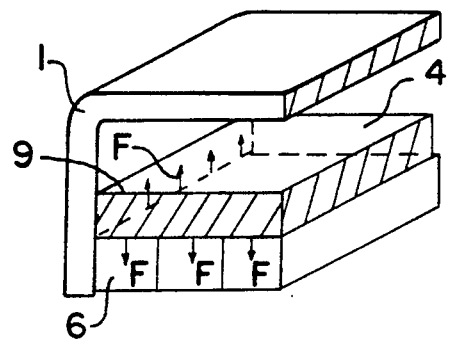

FIG. 5 depicts a detail of the known bushing designated 8 in FIG. 4. Edges of the pressure plate 4 have a recess 9 in order that the pressure plate may at all times be inserted into the frame 1, also taking into account tolerances in the dimensions of frame 1. An upward movement of rubber of the blocks 6 deforming during compression, which upward movement results from forces F acting in the direction of the arrows, gives rise to an irregular edge of protruding rubber on both edges of the pressure plate 4.

Figure 6:
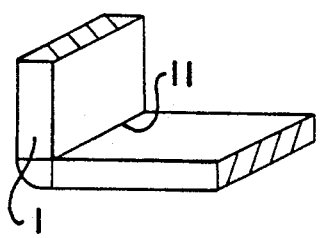

FIG. 6 shows a detail of the known bushing designated 10 in FIG. 4. As the frame 1 is composed by welding strips or similar component parts together, the angles of the frame 1 may be liable to small continuous weld fissures 11 which cannot be sealed by non-compressible blocks 12.

Figure 7:
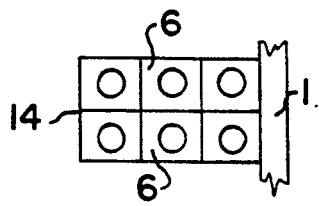

FIG. 7 represents a detail of the known bushing designated 13 in FIG. 4. For reasons mentioned herein before, no adequate sealing proves feasible in actual practice between rows of blocks 6 between which a rod-shaped element 14 is confined.

Figure 8:
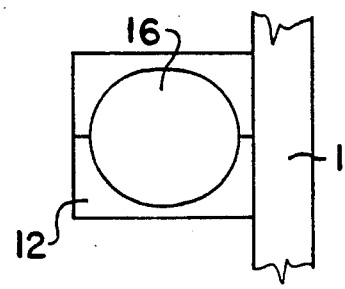

FIG. 8 depicts a detail of the known bushing designated 15 in FIG. 4. As the blocks 6 disposed in the uppermost zone of frame 1 absorb substantially the entire downward directed pressure exerted by the pressure plate 4 and the thrust bolt 3, a cable 16 passed through block 12 is not adequately sealed since, failing sufficient downward directed pressure on the spot, the halves of block 12 are not compressed sufficiently tight under operating conditions, so that continuous interfacial fissures persist between the said halves.

Figure 9:
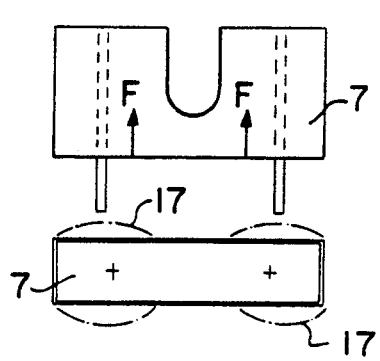

FIG. 9 shows a plan and a front view of the sealing plate of FIG. 4. The forces indicated by F and acting in the direction of the arrows cause a lateral deformation 17 relative to frame 1 (denoted by dotted lines) of the blocks 6 disposed in the uppermost zone of frame 1.

Figure 10:
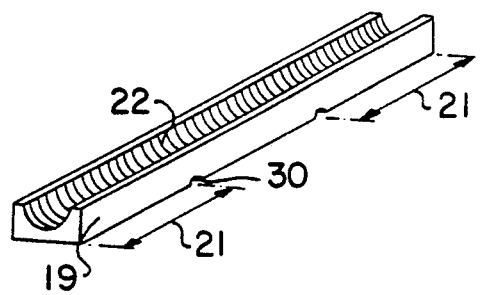
FIG. 10 represents one half of a parallelepipedal block of a bushing according to the invention, which half is provided with internal ribs having a saw-tooth cross-section.
Figure 11:
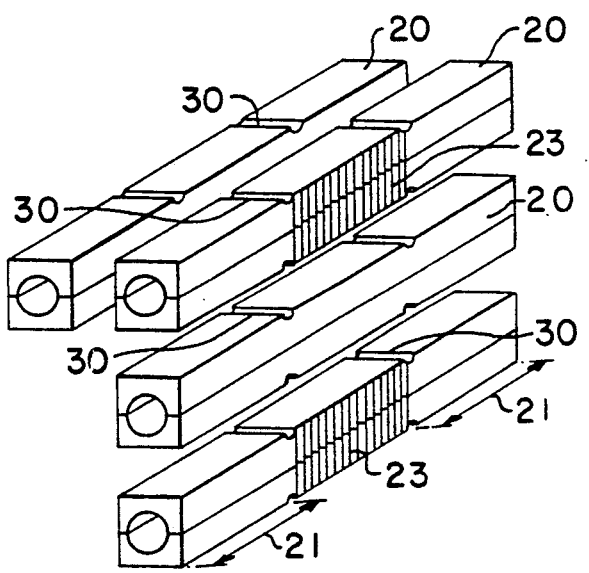
FIG. 11 shows parallelepipedal blocks of a bushing according to the invention, which blocks are provided with external ribs having a saw-tooth cross-section and with grooves for the accommodation of anchoring strips.

FIGS. 10 and 11 show one half 19 of a parallelepipedal block 20 and several parallelepipedal blocks 20, respectively, which are dimensioned such that, under operating conditions of the bushing according to the invention, they project outside on both sides of a frame of the bushing in a direction transverse to the plane of the frame over distances 21 (say, 60 mm at a frame width also of 60 mm, so that the overall width is 180 mm). The blocks 20 are provided with circumferential internal ribs 22 over at least a part of their length, whilst blocks 20 whose outer faces rest against an inner wall of the frame under operating conditions of the bushing according to the invention are provided at least partly with external ribs 23 on the said outer faces.

FIG. 13 represents a sealing piece 24 according to the invention which is composed of two halves that can be interconnected through dowelling. This sealing piece 24 is also dimensioned such that, under operating conditions of the bushing according to the invention, it projects outside over distances 21 on both sides of the frame in a direction transverse to the plane of the frame. Those outer faces of the sealing piece 24 which again under operating conditions rest against an inner wall of the frame are provided at least partly with external ribs 23. The sealing piece 24 also contains a recess 25 into which a pressure plate 26 of FIG. 12 can be received. As a result, no heat transmission through the pressure plate 26 and the "invulcanised" bolts takes place under operating conditions of the bushing.

Figure 12:
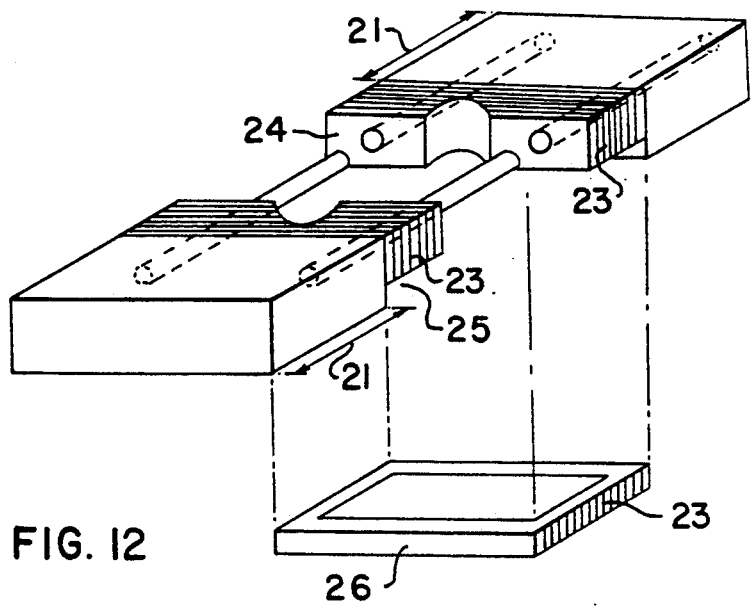
FIG. 12 shows a pressure plate according to the invention with external ribs having a saw-tooth cross-section.

Those faces of the steel pressure plate 26 of FIG. 12 which rest against an inner wall under operating conditions are also provided with external ribs 23.

Figure 14:
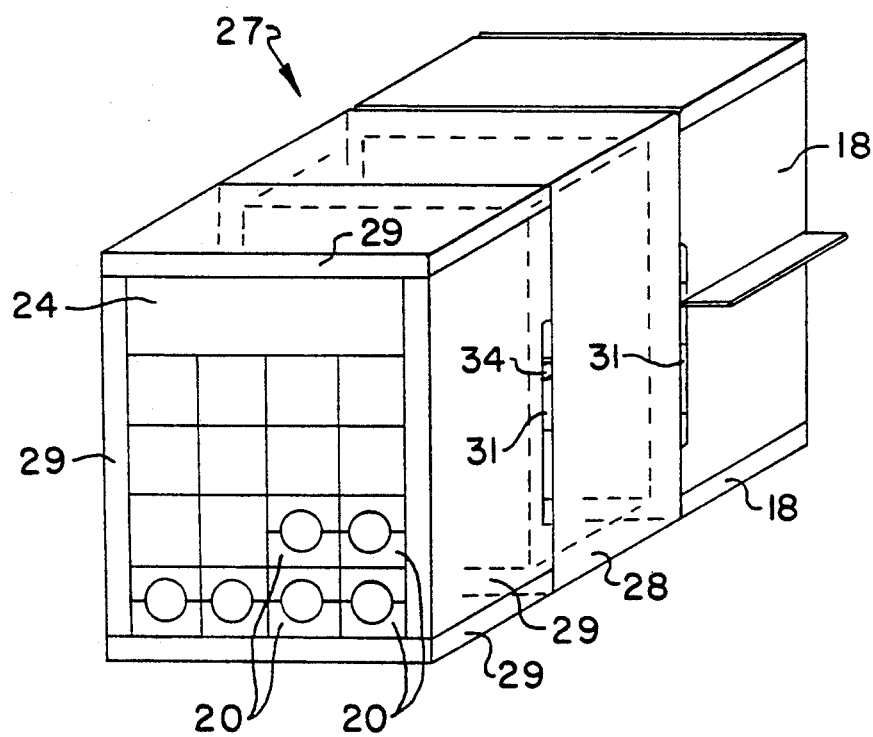
FIG. 14 is a greatly simplified view of a bushing according to the invention.

FIG. 14 is a greatly simplified view of a bushing 27 according to the invention with the frame 28, the blocks 20, the sealing piece 24, protecting plates 29 made of a fire-resistant platic and a hood 18 which for the sake of simplicity of the drawing is shown on one side only of the bushing 27. The blocks 20 of FIGS. 10 and 11 have grooves 30 and the protecting plates 29 are provided with recesses 31 such that anchoring strips 34 can be pushed from the outside into the grooves 30, whereupon the protecting plates 29 can be introduced, allowing the anchoring strips to pass through the recesses 31.

The bushing 27 according to the invention has the highly significant advantage that no heat transmission whatever can take place through the frame 28, the pressure plate 26, the sealing piece 24, the anchoring strips and the through bolts, because all metal parts have been screened by fire-resistant rubber.

FIGS. 15a–15c show an embodiment of one half of a parallelepipedal block of a bushing according to the invention in side view, in plan view and in cross section (along the line A—A of FIG. 15a), respectively. This embodiment corresponds to the ones of the FIGS. 1–14, on the understanding that now blocks which are placed on top of each other under operating conditions of the bushing, are provided with a profile 32 on their adjacent outer faces. The presence of these profiles 32 ensures an optimum sealing at all times, since any tolerances in the dimensions of blocks can easily be taken up by compression of these profiles 32. Furthermore, the presence of these profiles 32 ensures that no deformation of rubber occurs and that, as already mentioned, less sealing compression is needed.

I claim:

1. A bushing for the sealing passage of a cable, pipe and the like through a wall, comprising a frame having a predetermined depth made of a rigid material which may be sealingly inserted in an aperture provided in the wall; one or more parallelepipedal blocks of a resilient material such as rubber which may be composed from two identical halves, which blocks in their composite state exhibit a bore adapted with narrow tolerances to the shape and dimensions of a cable to be passed through, which blocks can be inserted in the frame aperture so as to be a fine fit, with the two halves of every block encasing a cable; and tightening means with a pressure plate for compressing the blocks inserted in the frame aperture in the plane of the aperture such that a sealing compression is effected between the two halves of any one block, between the outer faces of mutually adjacent blocks, between the wall of the bores and the outer surface of the cables contained therein, as well as between the outer faces of the blocks and the inner walls of the frame, characterized in that the blocks are dimensioned such that, under operating conditions of the bushing, they extend outwardly on at least one side of the frame in a direction transverse to the plane of the frame a distance equal to about said predetermined depth of the frame, which blocks are provided with circumferential internal ribs over at least a part of their length, and that blocks whose outer faces rest against an inner wall of the frame under operating conditions of the bushing are provided with external ribs over at least a part of the said outer faces.

2. A bushing according to claim 1, characterized in that blocks which are placed on top of each other under operating conditions of the bushing are provided with a profile on their adjacent outer faces.

3. A bushing according to claim 2, characterized in that the blocks are dimensioned such that, under operating conditions of the bushing, they extend outwards on both sides of the frame in a direction transverse to the plane of the frame.

4. A bushing according to claim 3, in which the tightening means comprise a rigid pressure plate with a thrust bolt, characterized in that the rigid plate is a steel plate whose edges, which rest against an inner wall of the frame under operating conditions of the bushing, have been encased in fire-resistant plastic.

5. A bushing according to claim 4, in which a sealing piece is present that can be fitted on top of the pressure plate inside the frame, characterized in that the sealing piece is dimensioned such that, under operating conditions of the bushing, it extend outwards on at least one side of the frame in a direction transverse to the plane of the frame and that those outer faces of the sealing piece which rest against an inner wall of the frame under operating conditions of the bushing are provided at least partly with external ribs.

6. A bushing according to claim 5, characterized in that the sealing piece consists of at least two interconnecting parts and that its bottom face defines a recess dimensioned to sealingly receive the steel plate and surround edges of the steel plate extending transversely to the inner wall of the frame.

7. A bushing according to any one of the preceding claims, 1, 6 characterized in that the external or internal ribs have a substantially saw-tooth or triangular cross-section.

8. A bushing according to any one of the preceding claims 1–6, characterized in that at least one protecting plate is provided, made of a fire-resistant plastic, substantially over that part of an assembly of blocks and the sealing piece which projects outside on at least one side of the frame in a direction transverse to the plane of the frame.

9. A bushing according to claim 8, characterized in that provision is made for at least one hood, moulded from perforated steel plate, which may be mounted on top of the protecting plate to be fitted earlier.

10. A bushing according to claim 9, characterized in that the design of the protective hood includes a frame composed of at least two sections with upright flanges.

11. A bushing according to claim 8, characterized in that provision is made for anchoring strips which may be inserted on at least one side of the frame in a direction parallel to the plane of the frame.

12. A bushing according to claim 11, characterized in that the outer faces of the blocks are provided with grooves and that recesses are present in the protecting plate so that the anchoring strips can be pushed from the outside into the grooves of the blocks, whereupon the protecting plates can be fitted, allowing the anchoring strips to pass through the recesses.

13. A bushing for sealing the passage of a cable, pipe and the like through a wall, comprising:
   a frame made of a rigid material which may be sealingly inserted in an aperture provided in the wall;
   a plurality of parallelepipedal blocks of a resilient material, said blocks each defining a bore therethrough adapted to sealingly receive said cable, pipe and the like for passage through the wall, and said blocks being sealingly received in said frame and extending outward on at least one side of the frame in a direction transverse to the plane of the frame;

tightening means for compressing the blocks received in said frame to provide a sealing compression between the blocks, and the blocks and the frame, said tightening means comprising a thrust bolt and a rigid pressure plate forced against the blocks by turning said thrust bolt; and a sealing piece comprising at least two opposed parts disposed on top of said pressure plate and inside said frame, said sealing piece being dimensioned to extend outward on at least one side of the frame in a direction transverse to the plane of the aperture, said sealing piece having a bottom face abutting a top surface of the blocks and also extending outward from the frame, wherein said bottom face defines a recess dimensioned to sealingly receive said rigid plate and surround edges of the plate extending transversely to the frame with said rigid plate being insulated from external surfaces of the bushing to reduce heat transfer therethrough.

14. The bushing according to claim 13, wherein each of said sealing piece parts has at least one bore transverse to the plane of the aperture and opening only on a surface facing the opposite part to communicate with the opposite bore to define a blind hole for receiving a dowel to connect said parts, and further comprising a dowel disposed in said blind hole, whereby said dowel is insulated from external surfaces of the bushing to prevent heat transfer therethrough.

15. The bushing according to claim 13, wherein only blocks having outer faces resting against an inner wall of the frame are provided with external ribs over at least a part of said outer faces.

16. The bushing according to any one of claims 13, 14, or 15, further comprising a protecting plate made of fire resistant material fitted over the outward extending portion of said blocks, said protecting plate having an inner surface parallel to and lying against an outer surface of said blocks and having an edge approximately perpendicular to said inner surface and abutting said frame, whereby said frame is insulated from external surfaces of the bushing to prevent heat transfer therethrough.

17. A bushing for sealing the passage of a cable, pipe and the like through a wall, comprising:

a frame made of a rigid material which may be sealingly inserted in an aperture provided in the wall;

a plurality of parallelepipedal blocks of a resilient material, said blocks each defining a bore therethrough adapted to sealingly receive said cable, pipe and the like for passage through the wall, and said blocks being sealingly received in said frame and extending outward on at least one side of the frame in a direction transverse to the plane of the aperture, said blocks defining grooves extending along at least one of a top and bottom surface in a direction parallel with the plane of the aperture;

tightening means for compressing the blocks received in said frame to provide a sealing compression between the blocks, and the blocks and the frame, said tightening means comprising a thrust bolt and a rigid pressure plate forced against the blocks by turning said thrust bolt;

a protecting plate made of fire resistant material fitted over the outward extending portion of said blocks, said protecting plate having an inner surface parallel to and lying against an outer surface of said blocks and having an edge approximately perpendicular to said inner surface and abutting the frame, said edge defining recesses aligned with the grooves in the blocks; and anchoring strips received in the recesses and the grooves, whereby the protecting plates insulates the frame from external surfaces of the bushing to prevent heat transfer therethrough.

* * * * *

UNITED STATES PATENT AND TRADEMARK OFFICE
CERTIFICATE OF CORRECTION

PATENT NO. : 5,108,060
DATED : April 28, 1992
INVENTOR(S) : Johannes A. Beele

It is certified that error appears in the above-indentified patent and that said Letters Patent is hereby corrected as shown below:

Col. 8, Claim 7, line 2, change "1.6" to --1-6--.

Signed and Sealed this

Twentieth Day of July, 1993

Attest:

MICHAEL K. KIRK

*Attesting Officer*  Acting Commissioner of Patents and Trademarks

UNITED STATES PATENT AND TRADEMARK OFFICE
CERTIFICATE OF CORRECTION

PATENT NO. : 5,108,060
DATED : April 28, 1992
INVENTOR(S) : Johannes A. Beele

It is certified that error appears in the above-indentified patent and that said Letters Patent is hereby corrected as shown below:

In the drawings, Sheet 2 of 4, to the bottom right side of the Figure 12 of the apparatus denoted with "21, 23, and 24" please insert --FIG. 13--.

Signed and Sealed this

Fifteenth Day of March, 1994

Attest:

BRUCE LEHMAN

Attesting Officer

Commissioner of Patents and Trademarks

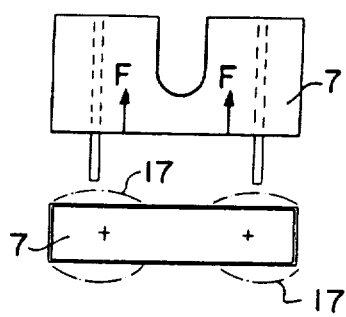
FIG. 9
Prior Art
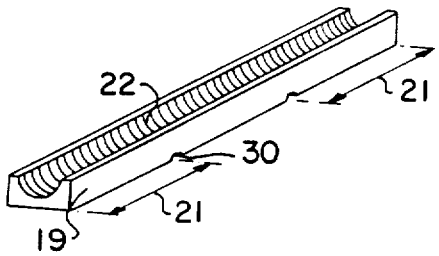
FIG. 10
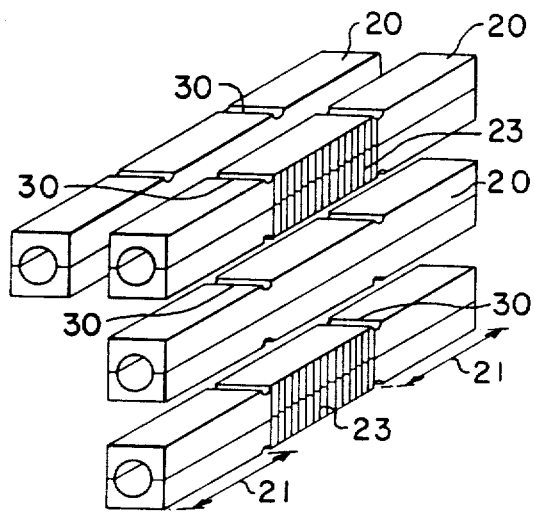
FIG. 11
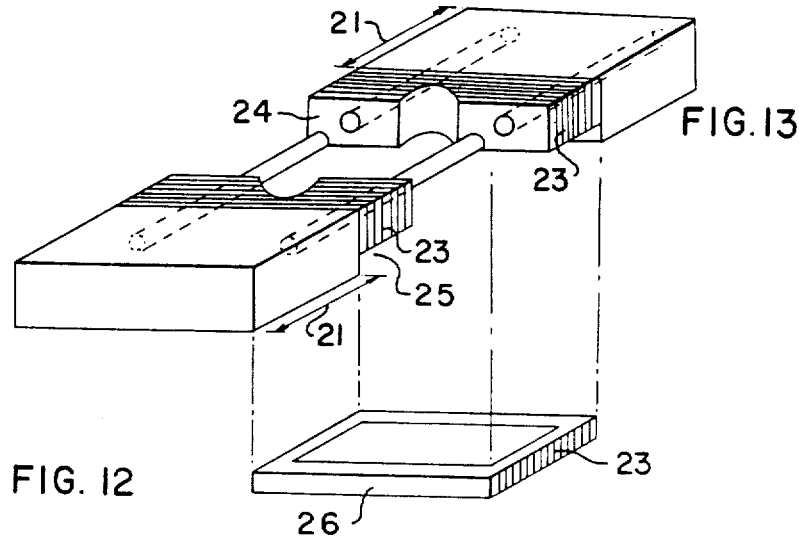
FIG. 12
FIG. 13